(12) United States Patent
Chang et al.

(10) Patent No.: US 9,723,407 B2
(45) Date of Patent: Aug. 1, 2017

(54) COMMUNICATION APPARATUS AND SOUND PLAYING METHOD THEREOF

(71) Applicant: HTC Corporation, Taoyuan (TW)

(72) Inventors: Wen-Lin Chang, Taoyuan (TW); Chien-Yuan Chen, Taoyuan (TW); Shih-Pei Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 45 days.

(21) Appl. No.: 14/817,218

(22) Filed: Aug. 4, 2015

(65) Prior Publication Data

US 2017/0041709 A1    Feb. 9, 2017

(51) Int. Cl.
*H04R 3/12* (2006.01)
*H04W 52/02* (2009.01)
*G06F 1/32* (2006.01)
*H04M 1/60* (2006.01)
*H04M 1/725* (2006.01)

(52) U.S. Cl.
CPC ............ *H04R 3/12* (2013.01); *G06F 1/3265* (2013.01); *G10H 2230/021* (2013.01); *G10H 2230/041* (2013.01); *G10H 2240/251* (2013.01); *G10H 2250/455* (2013.01); *H04M 1/6008* (2013.01); *H04M 1/72522* (2013.01); *H04M 1/72558* (2013.01); *H04R 2430/01* (2013.01); *H04W 52/027* (2013.01); *H04W 52/0254* (2013.01); *Y02B 60/1242* (2013.01); *Y02B 60/50* (2013.01)

(58) Field of Classification Search
CPC ....... G10H 2240/251; G10H 2230/041; G10H 2250/455; G10H 2250/035; G10H 2230/021; H04M 1/6008; H04M 1/72522; H04M 1/72558; H04W 52/027; H04W 52/0254; G06F 1/3265; Y02B 60/1242; Y02B 60/50; H04R 3/12; H04R 2430/01
See application file for complete search history.

(56) References Cited

U.S. PATENT DOCUMENTS

| 4,653,087 | A | * | 3/1987 | Galich | ............... H04M 1/82 379/110.01 |
| 8,600,084 | B1 | * | 12/2013 | Garrett | ............... H04R 5/04 381/123 |
| 2002/0045438 | A1 | * | 4/2002 | Tagawa | ............. H04M 1/72519 455/412.1 |
| 2002/0121181 | A1 | * | 9/2002 | Fay | ............... G10H 1/0066 84/609 |
| 2004/0204194 | A1 | * | 10/2004 | Akai | ............... H04M 1/03 455/575.1 |
| 2005/0239446 | A1 | * | 10/2005 | Tagawa | ............ H04M 19/041 455/414.1 |

(Continued)

*Primary Examiner* — Davetta W Goins
*Assistant Examiner* — Kuassi Ganmavo
(74) *Attorney, Agent, or Firm* — Jianq Chyun IP Office

(57) ABSTRACT

A communication apparatus and a sound playing method thereof are provided. The method is adapted for a communication apparatus having a first speaker used as an earpiece and a second speaker, in which the first speaker and the second speaker are disposed at opposite sides of the communication apparatus. In the method, an event with a sound notification is detected. A left channel sound and a right channel sound of the sound notification are mixed to generate a mixed sound in response to detecting the event. The mixed sound is played by the first speaker with a fade-in effect.

18 Claims, 4 Drawing Sheets

(56) References Cited

U.S. PATENT DOCUMENTS

| | | | | |
|---|---|---|---|---|
| 2006/0025159 | A1* | 2/2006 | Estevez | H04M 1/72566 455/456.3 |
| 2010/0142730 | A1* | 6/2010 | Lindahl | H04R 5/04 381/119 |
| 2012/0146790 | A1* | 6/2012 | Ladouceur | G08B 3/10 340/540 |
| 2012/0231849 | A1* | 9/2012 | Yamashita | H04M 1/0245 455/566 |
| 2012/0270604 | A1* | 10/2012 | Chang | G06F 1/3262 455/566 |
| 2013/0163765 | A1* | 6/2013 | De Jong | H04S 7/304 381/17 |
| 2013/0321714 | A1* | 12/2013 | Kobayashi | H04N 5/2628 348/738 |
| 2014/0134990 | A1* | 5/2014 | Chou | H04W 52/0235 455/418 |
| 2016/0119708 | A1* | 4/2016 | Rodzevski | H04R 1/1041 381/74 |

* cited by examiner

* # COMMUNICATION APPARATUS AND SOUND PLAYING METHOD THEREOF

BACKGROUND

In recent years, different types of small-sized and highly portable electronic devices, such as smartphones or tablet PCs, have been developed along with the advancement of electronic technology and communication technology. Such devices are usually integrated with many functions in order to improve their market competitiveness. Besides appearance, display quality, and processing speed, sound effect is also a major factor considered by the customers in purchasing such products.

Due to limited space, smartphones are usually equipped with only one speaker for audio playback, which results in monotonous sound effect since the sound is produced from only one speaker. Based on the knowledge that a stereo effect requires at least two speakers, smartphone manufacturers re-design the device structure to further place a speaker on the front plane of the device but at an opposite side to an earpiece (i.e. a part of a device that is placed in accordance with the ear for listening to something) of the device. This speaker is accompanied with the earpiece to respectively produce a left channel sound and a right channel sound of an audio played by the device so as to provide a stereo sound effect. However, by using the earpiece as the speaker of one sound channel, when the user just ends a call or the user's ear is near the earpiece due to any purpose, an unexpected loud sound produced by the earpiece due to another call, a notification, or an alarm may shock the user since the user's ear is near the earpiece.

SUMMARY

The application provides a communication apparatus and a sound playing method thereof, through which a left channel sound and a right channel sound of a sound notification is mixed and played by a speaker used as the earpiece with a fade-in effect, thus preventing the user from being shocked by an unexpected loud sound.

The application provides a sound playing method, adapted for a communication apparatus having a first speaker used as an earpiece and a second speaker, in which the first speaker and the second speaker are disposed at opposite sides of the communication apparatus. In the method, an event with a sound notification is detected. A left channel sound and a right channel sound of the sound notification are mixed to generate a mixed sound in response to detecting the event. The mixed sound is played by the first speaker with a fade-in effect, and played by the second speaker without the fade-in effect.

In an example of the present application, the method further plays the mixed sound by the second speaker without the fade-in effect In an example of the present application, before the step of detecting the event with the sound notification, the method further comprises playing one of the left channel sound and the right channel sound of an audio by the first speaker and playing the other one of the left channel sound and the right channel sound of the audio by the second speaker.

In an example of the present application, after the step of playing the mixed sound by the first speaker with the fade-in effect and playing the mixed sound by the second speaker without the fade-in effect, the method further comprises returning to play the one of the left channel sound and the right channel sound of the audio by the first speaker and play the other one of the left channel sound and the right channel sound of the audio by the second speaker after playing the mixed sound for a predetermined time.

In an example of the present application, the event is a motion of the communication apparatus detected by a motion sensor, an object detected by a proximity sensor, or a touch event detected by a touch screen while the communication apparatus executes a call function.

In an example of the present application, the step of playing the mixed sound by the first speaker with the fade-in effect comprises increasing a sound volume of the mixed sound being played according to a nonlinear function.

The application provides a communication apparatus comprising a first speaker, a second speaker, a storage device, and a computing device. The first speaker is configured as an earpiece. The second speaker is disposed at an opposite side to the first speaker. The storage device is configured to record a plurality of modules. The computing device is coupled to the first speaker, the second speaker and the storage device and is configured to access and execute the modules recorded in the storage unit. The modules comprise an event detecting module, a sound mixing module and a sound playing module. The event detecting module detects an event with a sound notification. The sound mixing module mixes a left channel sound and a right channel sound of the sound notification to generate a mixed sound in response to the event detecting module detecting the event. The sound playing module plays the mixed sound by the first speaker with a fade-in effect.

In an example of the present application, the sound playing module further plays the mixed sound by the second speaker without the fade-in effect.

In an example of the present application, before the event detecting module detects the event, the sound playing module further plays one of the left channel sound and the right channel sound of an audio by the first speaker and plays the other one of the left channel sound and the right channel sound of the audio by the second speaker.

In an example of the present application, the sound playing module further returns to play the one of the left channel sound and the right channel sound of the audio by the first speaker and play the other one of the left channel sound and the right channel sound of the audio by the second speaker after playing the mixed sound for a predetermined time.

In an example of the present application, the communication apparatus further comprises a motion sensor and the event is a motion of the communication apparatus detected by the motion sensor.

In an example of the present application, the communication apparatus further comprises a proximity sensor and the event is an object detected by the proximity sensor.

In an example of the present application, the communication apparatus further comprises a touch screen and the event is a touch event detected by the touch screen while the communication apparatus executes a call function.

In an example of the present application, the sound playing module increases a sound volume of the mixed sound being played according to a nonlinear function to produce the fade-in effect.

In an example of the present application, the event comprises an incoming call, a notification, or alarm.

The application provides a non-transitory computer readable medium in which a computer program is recorded. The computer program is loaded by a communication apparatus to execute the following steps. First, an event with a sound notification is detected. Then, a left channel sound and a right channel sound of the sound notification are mixed to generate a mixed sound in response to detecting the event. Finally, the mixed sound is played by a first speaker used as an earpiece with a fade-in effect, wherein the first speaker and the second speaker are disposed at opposite sides of the communication apparatus.

Based on the above, in the communication apparatus and the sound playing method thereof provided by the present application, an audio playback mode of the communication apparatus is switched from a stereo mode to a mixing mode in which the left and right channel sounds of a sound notification are mixed to generate a mixed sound. The mixed sound is then played with a fade-in effect by the speaker used as an earpiece when an event with the sound notification is detected, thereby preventing the user from being shocked by the unexpected loud sound.

In order to make the aforementioned and other features and advantages of the invention more comprehensible, several examples accompanied with figures are described in detail below.

BRIEF DESCRIPTION OF THE DRAWINGS

The accompanying drawings are included to provide a further understanding of the invention, and are incorporated in and constitute a part of this specification. The drawings illustrate examples of the invention and, together with the description, serve to explain the principles of the invention.

DESCRIPTION OF EXAMPLES

Figure 1:
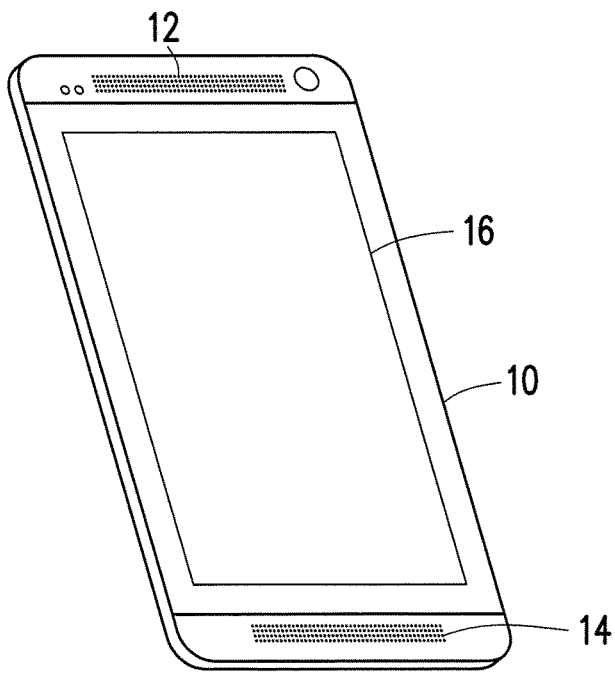
FIG. 1 is a schematic diagram of a communication apparatus according to an example of the application.

FIG. 1 is a schematic diagram of a communication apparatus according to an example of the application. Referring to FIG. 1, the sound playing method of the application is adapted for the communication device 10 having at least two speakers, in which one speaker 12 is used as an earpiece. The two speakers 12 and 14 are disposed at opposite sides on the front plane including the screen 16 of the communication apparatus 10. Specifically, the speaker 12 is disposed at the top of the communication device 10 while the speaker 14 is disposed at the bottom of the communication device 10.

The communication device 10 are normally operated in a stereo mode, in which the two speakers 12 and 14 are respectively set as a left channel speaker and a right channel speaker according to an orientation of the communication apparatus 10. When a user answers a call, the speaker 12 outputs a voice of the caller while the speaker 14 is muted to avoid interference. When the user ends the call, before resuming the stereo mode, the communication device 10 first detects an event with a sound notification and appropriately reduces the volume of the speaker 12 for playing the sound notification through performing a fade-in effect. That is, the sound notification is played with a relatively small volume in the beginning and the volume is gradually increased along the time of playing the sound notification until a preset volume limit. Additionally, the communication apparatus 10 further mixes a left channel sound and a right channel sound of the sound notification to generate a mixed sound and plays the mixed sound on both of the speakers 12 and 14 to ensure a vocal balance on the sound produced by the speakers 12 and 14.

Figure 2:
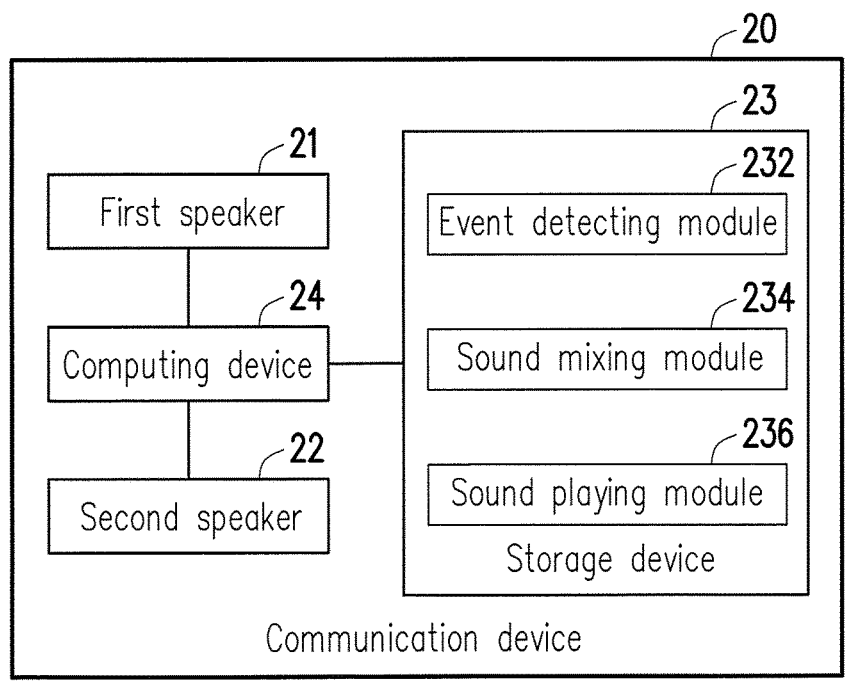
FIG. 2 is a block diagram of a communication apparatus according to an example of the application.

In detail, FIG. 2 is a block diagram of a communication apparatus according to an example of the application. Referring to FIG. 2, a communication apparatus 20 of the present example includes a first speaker 21, a second speaker 22, a storage device 23 and a computing device 24. The communication apparatus 20 is, for example, a portable electronic apparatus having communication capability such as a cellular phone, a personal digital assistant (PDA), a smartphone, a media player, or a tablet PC, which are not particularly limited herein.

The first speaker 21 is configured as an earpiece and the second speaker 22 is disposed at an opposite side to the first speaker 21 of the communication apparatus 20. The disposition of the first speaker 21 and the second speaker 22 are similar to that of the speaker 12 and the speaker 14 in FIG. 1, thus the details are not repeated herein.

The storage device 23 may be a fixed or a movable device in any possible forms including a random access memory (RAM), a read-only memory (ROM), a flash memory or other similar devices, or a combination of the above-mentioned devices. In the present example, the storage device 23 is configured to record an event detecting module 232, a sound mixing module 234 and a sound playing module 236. Those modules are, for example, programs stored in the storage device 23 which can be loaded by the computing device 24 of the communication apparatus 20, so that the computing device 24 may execute functions of sound playback.

The computing device 24 is connected to the first speaker 21, the second speaker 22, and the storage device 23. The computing device 24 may be a central processing unit (CPU) or other programmable devices for general purpose or special purpose such as a microprocessor, a digital signal processor (DSP), a programmable controller, an application specific integrated circuit (ASIC) or other similar elements or a combination of above-mentioned elements. In the present example, the computing device 24 is configured to access and execute the modules recorded in the storage device 23, so as to execute the sound playing method of the present application.

Figure 3:
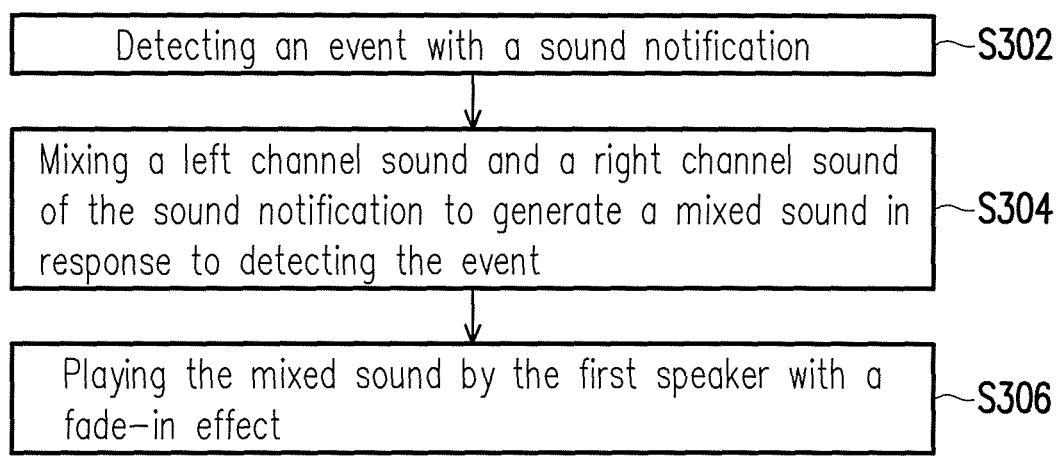
FIG. 3 is a flowchart illustrating a sound playing method according to an example of the present application.

Specifically, FIG. 3 is a flowchart illustrating a sound playing method according to an example of the present application. Referring to FIG. 2 and FIG. 3 together, the method of the present example is adapted for aforesaid communication apparatus 20. Detailed steps of the method are described as below, with reference to each element of the communication apparatus 20 depicted in FIG. 2.

First, the event detecting module 232 detects an event with a sound notification (step S302). The event comprises an incoming call received by a phone application, IM (Instant Message) application, social network application, or other applications, programs, etc. with call function, an ala ii, or a notification in response to receiving a new message from an instant messaging application, a new email from an email application, a new update from a social network application, or other data provided by other applications, which is not particularly limited herein. The sound notification of the event may contain a left channel sound and a right channel sound to be played by the first speaker 21 and the second speaker 22.

Then, the sound mixing module 234 mixes the left channel sound and the right channel sound of the sound notification to generate a mixed sound in response to the event detecting module 232 detecting the event (step S304). Finally, the sound playing module 236 plays the mixed sound by the first speaker 21 with a fade-in effect (step S306). In detail, the sound playing module 236 may play the mixed sound in a relatively small volume by the first speaker 21 to reduce the impact of the sound on the user's ear. Then, the sound playing module 236 may gradually increase the volume of the first speaker 21 to draw the user's attention until the volume reaches the original volume or a volume limit. The increase on the volume may be determined according to a nonlinear function, such as an exponential function, which are not particularly limited herein.

It is noted that, in another example, when the sound playing module 236 plays the mixed sound by the first speaker 21 with the fade-in effect, it may further play the mixed sound by the second speaker 22 without the fade-in effect (i.e. in an original volume), so as to ensure a vocal balance on the sound produced by the first speaker 21 and the second speaker 22 and to ensure the volume of the sound produced by the first speaker 21 and the second speaker 22 is loud enough to draw the user's attention.

The method of aforesaid example may be applied under any condition when detecting the event with the sound notification, such that no matter whether the user's ear is close to the first speaker 21, the sound notification played by the first speaker 21 will be smoother to ensure the user is not shocked by the unexpected sound. However, in other examples, the method of the application may be applied under specific conditions. Examples are given below for further illustration.

Figure 4:
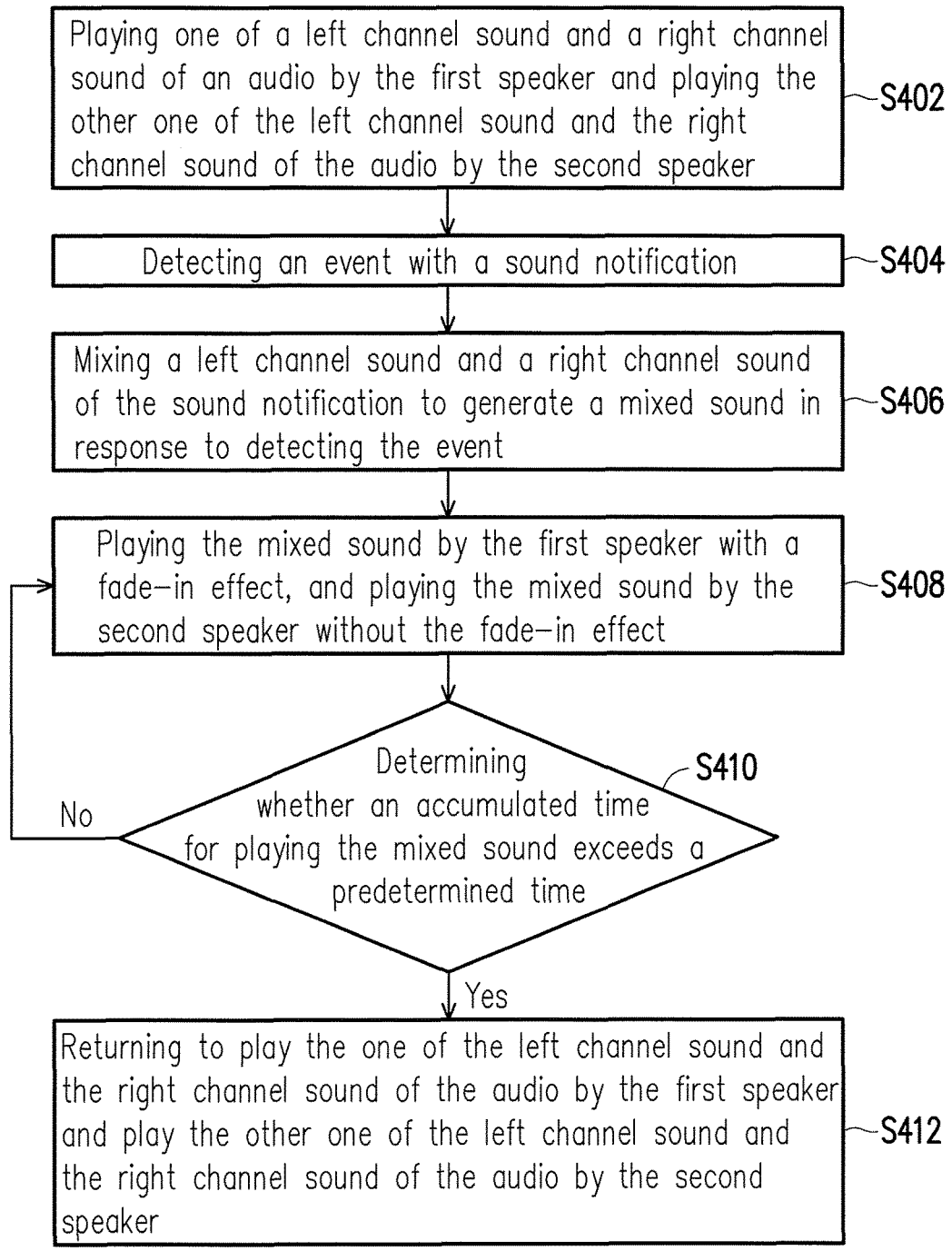
FIG. 4 is a flowchart illustrating a sound playing method according to an example of the present application.

In one example, the method is applied when the communication apparatus is in the stereo mode. FIG. 4 is a flowchart illustrating a sound playing method according to an example of the present application. Referring to FIG. 2 and FIG. 4 together, the method of the present example is adapted for aforesaid communication apparatus 20. Detailed steps of the method are described as below, with reference to each element of the communication apparatus 20 depicted in FIG. 2.

First, the sound playing module 236 plays one of the left channel sound and the right channel sound of an audio by the first speaker 21 and plays the other one of the left channel sound and the right channel sound of the audio by the second speaker 22 (step S302). In the present example, the communication apparatus 20 is originally operated in a stereo mode, during which the sound played on the first speaker 21 and the second speaker 22 may be determined according to an orientation of the communication apparatus 20. In detail, a G-sensor is further used for detecting aforesaid orientation. If the communication apparatus 20 is detected as having the first speaker 21 on the left and having the second speaker 22 on the right, then the first speaker 21 and the second speaker 22 are respectively configured to play the left channel sound and the right channel sound. On the contrary, if the communication apparatus 20 is detected as having the first speaker 21 on the right and having the second speaker 22 on the left, then the first speaker 21 and the second speaker 22 are respectively configured to play the right channel sound and the left channel sound.

Next, the event detecting module 232 detects an event with a sound notification (step S404). The sound mixing module 234 mixes the left channel sound and the right channel sound of the sound notification to generate a mixed sound in response to the event detecting module 232 detecting the event (step S406). Finally, the sound playing module 236 plays the mixed sound by the first speaker with a fade-in effect, and plays the mixed sound by the second speaker without the fade-in effect (step S408). The steps S404 to S408 are the same as or similar to the steps S302 to S306 in the previous example, thus the details are repeated herein.

The difference between the present example and the previous example lies in that, in the present example, when the sound playing module 236 plays the mixed sound, the sound playing module 236 further calculates an accumulated time for playing the mixed sound and determines whether the calculated accumulated time exceeds a predetermined time (step S410). The predetermined time may be 5 seconds, 9 second or any other time length, which is not particularly limited herein.

If the accumulated time is determined as not exceeding the predetermined time, the flow is returned to step S408 to keep playing the mixed sound. However, if the accumulated time is determined as exceeding the predetermined time, the sound playing module 236 returns back to the stereo mode to play the one of the left channel sound and the right channel sound of the audio by the first speaker and play the other one of the left channel sound and the right channel sound of the audio by the second speaker (step S412).

Through aforesaid method, the communication apparatus 20 is able to automatically switch between the stereo mode and a mixing mode of playing the mixed sound, and therefore the user will not be shocked by the unexpected sound when listening to an audio.

Figure 5:
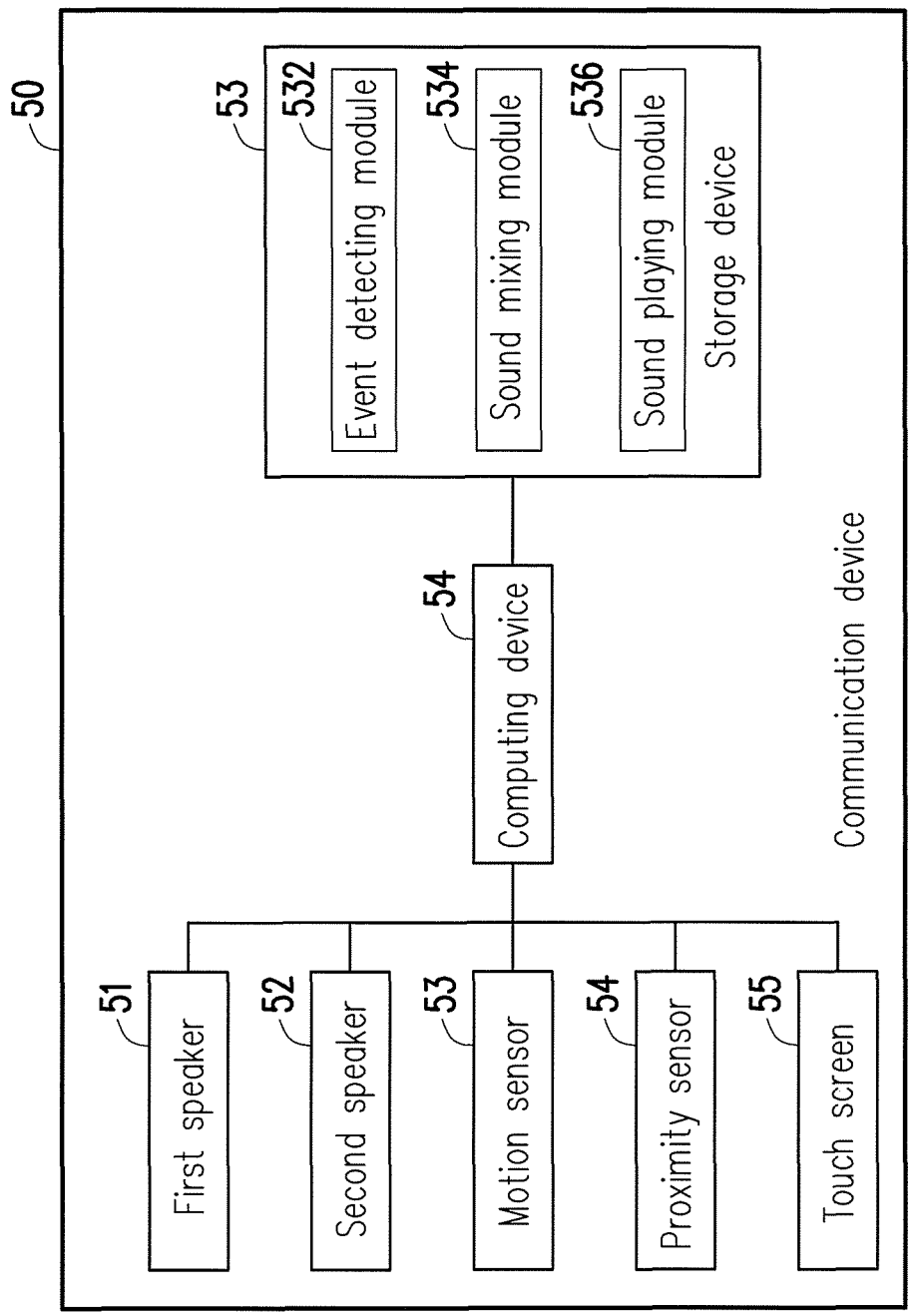
FIG. 5 is a block diagram of a communication apparatus according to an example of the application.

In other examples, the method is applied when a specific user's operation is detected. FIG. 5 is a block diagram of a communication apparatus according to an example of the application. Referring to FIG. 5, a communication apparatus 50 of the present example includes a first speaker 51, a second speaker 52, a storage device 53, a computing device 54, a motion sensor 55, a proximity sensor 54, and a touch screen 55. The communication apparatus 50 is, for example, a portable electronic apparatus having communication capability such as a cellular phone, a PDA, a smartphone, a media player, or a tablet PC, which are not particularly limited herein. The storage device 53 is configured to record an event detecting module 532, a sound mixing module 534 and a sound playing module 536. Those modules are, for example, programs stored in the storage device 53 which can be loaded by the computing device 54 of the communication apparatus 50, so that the computing device 54 may execute functions of sound playback. The types and functions of the first speaker 51, the second speaker 52, the storage device 53, and the computing device 54 are the same as or similar to those of the first speaker 21, the second speaker 22, the storage device 23 in the previous example, and therefore will not be repeated herein.

The difference between the present example and the previous example lies in that, in the present example, a plurality of sensing devices are configured to detect a user behavior so as to trigger or deactivate the function of mixing sound and play the mixed sound.

In one example, the event is a motion of the communication apparatus 50 detected by the motion sensor 53, in which the event detecting module 532 detects the motion of the communication apparatus 50 by the motion sensor 53 to determine whether the communication apparatus 50 is static. If the event detecting module 532 determines the communication apparatus 50 is not static, it means the communication apparatus 50 the user may be used by the user. Therefore, the event detecting module 532 triggers the mixing of the left channel sound and the right channel sound and the playing of the mixed sound. Accordingly, the mixed mode of playing the mixed sound can be appropriately triggered when the user use the communication apparatus 50.

In one example, the event is an object detected by the proximity sensor 54, in which the event detecting module 532 detects the object by the proximity sensor 54. If the event detecting module 532 detects the object, it means the user's ear is close to the first speaker 51. Therefore, the event detecting module 532 triggers the mixing of the left channel sound and the right channel sound and the playing of the mixed sound. Accordingly, the mixed mode of playing the mixed sound can be appropriately triggered when the user's ear is close to the first speaker 51.

In one example, the event is a touch event detected by the touch screen 55 while communication apparatus 50 executes a call function, in which the event detecting module 532 detects the touch event by the touch screen 55 while the communication apparatus 50 executes a call function. If the event detecting module 532 detects the touch event and determines a pattern of the touch points of the touch event comply with a pattern that the user's face is attached to the touch screen 55, it means the user's ear is close to the first speaker 51. Therefore, the event detecting module 532 triggers the mixing of the left channel sound and the right channel sound and the playing of the mixed sound. Accordingly, the mixed mode of playing the mixed sound can be appropriately triggered when the user's ear is close to the first speaker 51.

In one example, the event detecting module 532 further detects a touch event by the touch screen 25 while the communication apparatus 50 executes an application excluding a call function. If the event detecting module 532 detects the touch event, it means the user just normally operates the communication apparatus 50 instead of listening to a call. Therefore, the event detecting module 532 deactivates the mixing of the left channel sound and the right channel sound and the playing of the mixed sound. Accordingly, the mixed mode of playing the mixed sound can be appropriately deactivated when the user normally operates the communication apparatus 50.

The present application further provides a non-transitory computer readable medium in which a computer program is record. The computer program is used to execute each step in the location display method as described above. The computer program is composed of a plurality of program code sections (i.e., building an organization diagram program code section, approving a list program code section, setting a program code section, and deploying a program code section). Moreover, after the program code sections are loaded into the portable communication apparatus and executed, the steps in the location display method may be implemented.

To sum up, in the communication apparatus and a sound playing method thereof provided by the invention, when an event with a sound notification is detected, the sound notification is played with a fade-in effect by a speaker used as an earpiece, such that the user will not easily be shocked by an unexpected loud sound. A left channel sound and a right channel sound of the sound notification are mixed to generate a mixed sound and the mixed sound is played on dual speakers such that a vocal balance on the sound produced by the speakers is ensured. Several means are further used to determine the user's behavior so as to appropriate trigger or deactivate the mixing mode of playing the mixed sound of the application.

Although the invention has been described with reference to the above examples, it will be apparent to one of the ordinary skill in the art that modifications to the described example may be made without departing from the spirit of the invention. Accordingly, the scope of the invention will be defined by the attached claims not by the above detailed descriptions.

What is claimed is:

1. A sound playing method, adapted for a communication apparatus having a first speaker used as an earpiece and a second speaker, the first speaker and the second speaker being disposed at opposite sides of the communication apparatus, comprising:
   detecting an event with a sound notification;
   mixing a left channel sound and a right channel sound of the sound notification to generate a mixed sound in response to detecting the event;
   playing the mixed sound by the first speaker with a fade-in effect; and
   playing the mixed sound by the second speaker without the fade-in effect.

2. The method according to claim 1, wherein before the step of detecting the event with the sound notification, the method further comprises:
   playing one of the left channel sound and the right channel sound of an audio by the first speaker and playing the other one of the left channel sound and the right channel sound of the audio by the second speaker.

3. The method according to claim 2, wherein after the step of playing the mixed sound by the first speaker with the fade-in effect and playing the mixed sound by the second speaker without the fade-in effect, the method further comprises:
   returning to play the one of the left channel sound and the right channel sound of the audio by the first speaker and play the other one of the left channel sound and the right channel sound of the audio by the second speaker after playing the mixed sound for a predetermined time.

4. The method according to claim 1, wherein the event is a motion of the communication apparatus detected by a motion sensor.

5. The method according to claim 1, wherein the event is an object detected by a proximity sensor.

6. The method according to claim 1, wherein the event is a touch event detected by a touch screen while communication apparatus executes a call function.

7. The method according to claim 1, wherein the step of playing the mixed sound by the first speaker with the fade-in effect comprises:
   increasing a sound volume of the mixed sound being played according to a nonlinear function.

8. The method according to claim 1, wherein the event comprises an incoming call, a notification, or an alarm.

9. A communication apparatus, comprising:
   a first speaker, configured as an earpiece;
   a second speaker, disposed at an opposite side to the first speaker;
   a storage device, configured to record a plurality of modules; and
   a computing device, coupled to the first speaker, the second speaker and the storage device and configured to access and execute the modules recorded in the storage device, wherein the modules comprise:
   an event detecting module, detecting an event with a sound notification;
   a sound mixing module, mixing a left channel sound and a right channel sound of the sound notification to generate a mixed sound in response to the event detecting module detecting the event; and a sound playing module, playing the mixed sound by the first speaker with a fade-in effect and playing the mixed sound by the second speaker without the fade-in effect.

10. The communication apparatus according to claim 9, wherein before the event detecting module detects the event, the sound playing module further plays one of the left channel sound and the right channel sound of an audio by the first speaker and plays the other one of the left channel sound and the right channel sound of the audio by the second speaker.

11. The communication apparatus according to claim 10, wherein the sound playing module further returns to play the one of the left channel sound and the right channel sound of the audio by the first speaker and play the other one of the left channel sound and the right channel sound of the audio by the second speaker after playing the mixed sound for a predetermined time.

12. The communication apparatus according to claim 9, wherein the communication apparatus further comprises a motion sensor and the event is a motion of the communication apparatus detected by the motion sensor.

13. The communication apparatus according to claim 9, wherein the communication apparatus further comprises a proximity sensor and the event is an object detected by the proximity sensor.

14. The communication apparatus according to claim 9, wherein the communication apparatus further comprises a touch screen and the event is a touch event detected by the touch screen while the communication apparatus executes a call function.

15. The communication apparatus according to claim 9, wherein the sound playing module increases a sound volume of the mixed sound being played according to a nonlinear function to produce the fade-in effect.

16. The communication apparatus according to claim 9, wherein the event comprises an incoming call, a notification, or an alarm.

17. A non-transitory computer readable medium for recording a computer program to be loaded by a communication apparatus to execute steps of:

detecting an event with a sound notification;

mixing a left channel sound and a right channel sound of the sound notification to generate a mixed sound in response to detecting the event; and playing the mixed sound by a first speaker used as an earpiece with a fade-in effect and playing the mixed sound by a second speaker without the fade-in effect, wherein the first speaker and the second speaker are disposed at opposite sides of the communication apparatus.

18. The non-transitory computer readable medium according to claim 17, wherein the event comprises an incoming call, a notification, or an alarm.

* * * * *